July 16, 1963  D. S. ANTRIM ETAL  3,097,666
CHECK VALVE

Filed Dec. 11, 1959  2 Sheets-Sheet 1

INVENTORS
DORON S. ANTRIM,
NELSON G. KLING
& VINCENT A. GILL.
BY RICHEY, McNENNY & FARRINGTON
Donald W. Farrington
ATTORNEYS

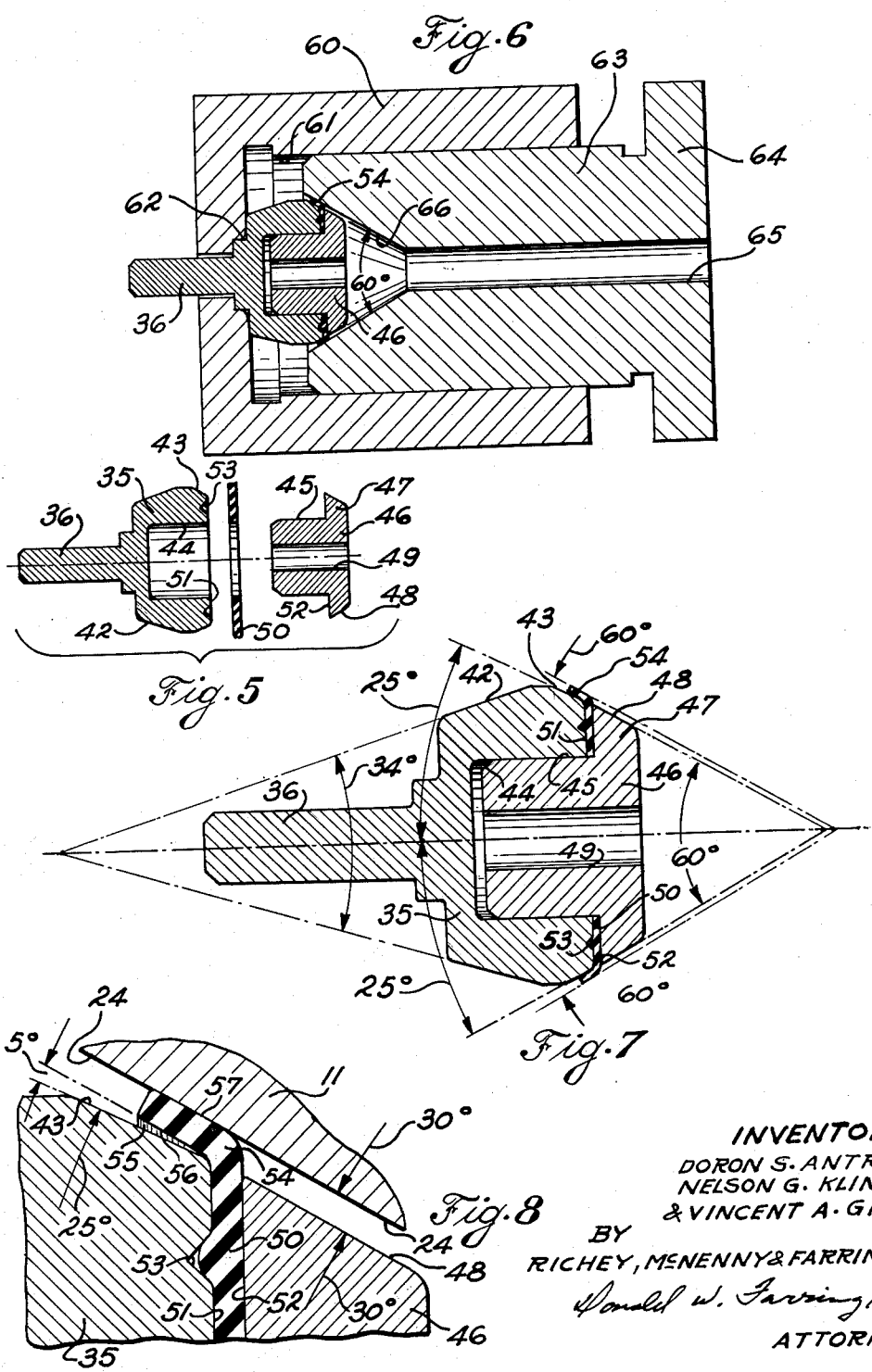

United States Patent Office 3,097,666
Patented July 16, 1963

3,097,666
CHECK VALVE
Doron S. Antrim, Garfield Heights, and Nelson G. Kling, Euclid, Ohio, and Vincent A. Gill, Montclair, N.J., assignors to The Weatherhead Company, Cleveland, Ohio, a corporation of Ohio
Filed Dec. 11, 1959, Ser. No. 858,946
5 Claims. (Cl. 137—515.5)

This invention relates to check valves, and more particularly to seals for check valves adapted for use over a wide temperature range.

Present day developments in such fields as aircraft and missiles have made increasingly severe demands on the performance of fluid pressure systems and their components. Among the many problems encountered in the design of the components for such fluid pressure systems is the requirement that they operate efficiently and reliably at high fluid pressures over an increasingly wide range of temperatures. Because of extreme changes and rapid fluctuations of environmental conditions, components are often required to operate not only at considerably elevated temperatures, but also at very low temperatures.

To meet the requirements of wide temperature range pressure systems, the check valve seal must be effective to prevent reverse flow leakage at both the high temperature range and the low temperature range. The problem of leakage past the seal has been particularly acute in the case of fluids such as gaseous helium, which is notorious for the leakage problem which it creates. Because of its low viscosity and small molecular size, a seal which might be effective when used with other fluids has an objectionable leakage rate when used with helium.

While check valves have been made with a wide variety of constructions, one of the most widely used arrangements is that in which a spring loaded poppet moves axially along the path of fluid flow and is spring loaded into contact with a valve seat. This general arrangement has many advantages such as compactness and simplicity in the number of parts, as well as being readily adaptable to insertion between sections of fluid pressure conduit.

To obtain an effective seal between the poppet and the valve seat, it has often been found necessary to make a portion of the sealing members out of a soft, resilient, deformable material such as rubber. However, these sealing members are not effective throughout a wide temperature range. A rubber material which is soft enough to seal effectively at low temperatures, fails at high temperatures due to excessive softening of the material so that under high pressure the material tends to cold flow and extrude out of the seal area. On the other hand, a rubber material which is strong enough to resist this cold flow at high temperatures becomes brittle and cracks at low temperatures. The use of deformable materials with greater temperature stability such as polytetrafluoroethylene and silicones have also extended the useful temperature range only slightly. These materials have a rate of thermal expansion which is much greater than that of the metals which are used for the valve bodies and poppets, so that when they are used outside of a limited temperature range, the seal parts made from these materials become so distorted as compared to the metal seal parts that an effective seal is no longer possible.

An object of this invention has been to provide a check valve having a valve poppet seal that is effective to prevent leakage of pressures throughout a wide temperature range from very low temperatures to considerably elevated temperatures.

Another object of this invention has been to provide a valve seal for a check valve which produces a minimum of turbulence and resistance to fluid flow when the valve is open, yet provides a lip seal action when the valve is closed whereby the pressure being sealed against is utilized to aid in the sealing action.

According to a preferred embodiment of the present invention, the valve seat is a smoothly finished conical surface formed on the metal valve body. The seal comprises a sheet of rigid plastic material, such as polyethylene terephthalate, which is carried by a metallic poppet also conical in shape. The sheet seal extends radially outward across the midsection of the poppet to the outer conical surface of the poppet, from which point it extends for a spaced distance both radially and axially forward along the surface of the poppet. It is an advantage of this design that the plastic material for the seal is preferably chosen as to have a thermal coefficient of expansion on the same order as that of the metal used for the poppet. The portion of the conical surface of the poppet which underlies the axially extending portion of the seal has a more acute apex angle than the angle of the conical surface of the valve seat. The plastic sheet is of relative constant thickness at all points, and thus when the poppet is seated with the axially rearward portion of the seal in abutting contact with the valve seat, the forward or outer end of the seal is free to move a short distance radially so that back fluid pressure lifts the forward portion of the seal away from the surface of the poppet and forces it outwardly against the surface of the valve seat. The back pressure thus provides a lip sealing action by forcing the seal into contact with the valve seat along the length of that portion of the seal which extends forward along the conical surface of the poppet. The greater the magnitude of the back pressure, the more tightly the seal is forced against the valve seat to resist the leakage of fluid between the seal and the seat.

Other features and advantages of this invention will become apparent to those skilled in the art upon a more complete understanding of the invention of which an embodiment is shown in the drawings and described in the following detailed description.

In the drawings:

FIG. 5 is an exploded longitudinal cross-sectional view of the component parts of the poppet assembly;

FIG. 6 is a longitudinal cross-sectional view showing the poppet in position in the tool which is used to form the seal;

FIG. 7 is an enlarged longitudinal cross-sectional view of the poppet as completely assembled; and FIG. 8 is a fragmentary cross-sectional view showing details of the seal construction.

Figure 1:
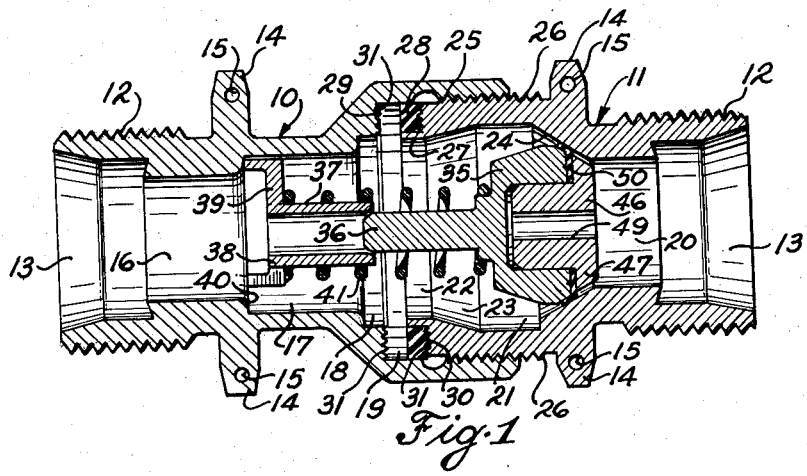
FIG. 1 is a longitudinal cross-sectional view of a check valve incorporating the invention before its assembly has been completed.

Referring now to the drawings, the valve has a body of two piece construction comprising a forward section 10 and a rearward section 11. As used herein, the forward direction is the direction in which fluid flows freely through the valve. The outer end of each of these sections has an externally threaded portion 12 and an internally recessed portion 13 of appropriate size and shape to receive tube fittings in the usual manner. Each of the body sections is also formed with an enlarged wrench-receiving portion 14 having holes 15 through which lock wires can be passed after the check valve has been assembled.

Each of the body sections is provided with a series of concentric bores to receive the remainder of the valve structure. The forward section 10 has four cylindrical bores 16, 17, 18, and 19, each of which respectively has a greater inner diameter. The rearward section 11 has three cylindrical bores 20, 21, and 22, of which the middle bore 21 is the largest. These three bores are interconnected by conical surfaces 23 and 24, the latter conical surface having a very smooth surface finish and serving as the valve seat, as will be described in greater detail hereinafter.

In order to fasten the two body sections together, the rearward bore 19 in forward section 10 is provided with internal threads 25 which are engaged by suitable external threads 26 on the front end of the rearward body section 11. In front of the threads 26 is a reduced annular sleeve 27 having bore 22 as its inside diameter and having an outside diameter to fit within the bore 18 in forward section 10. In order to seal against leakage at the joint between the two body sections, an annular gasket or crush washer 28, formed of a suitable material such as polytetrafluoroethylene, is fitted over the annular sleeve 27. When the two body sections are screwed together, the crush washer 28 is enclosed within an annular chamber bounded radially by bore 19 and sleeve 27 and axially by radially extending annular surfaces 29 and 30 on the body sections 10 and 11, respectively. These annular surfaces 29 and 30 each have annular serrations 31 which are forced into the crush washer as the latter is compressed to cause high localized stresses within the washer which increase the effectiveness of the sealing action.

Figure 4:
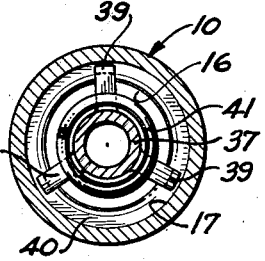
FIG. 4 is a cross-sectional view taken on lines 4—4 of FIG. 2 to show the poppet guide in greater detail.

The valve poppet 35 has a forwardly extending stem 36 which is a sliding fit within the rearward extending tubular portion 37 of the guide 38. To stabilize and position the guide 38, three narrow, symmetrically spaced legs 39 (see also FIG. 4) project radially outward from the forward end of the guide to contact the sides of bore 17 to position the guide radially, the spaces between the legs allowing fluid flow past the guide. The legs 39 also abut against shoulder 40 formed at the junction of cylindrical bores 16 and 17 to position the guide axially. A coil compression spring 41 is fitted around stem 36 and tubular portion 37 to abut at the ends on the guide legs 39 and the poppet 35 to bias the poppet normally rearwardly into the closed position to contact the conical valve seat 24.

The details of the construction of the poppet 35 are shown in greater detail in FIGS. 5 and 7. The poppet head is formed with two oppositely extending conical surfaces 42 and 43. The forwardly extending conical surface 42 is formed to minimize turbulence and has an included apex angle in this case of about 34°. The other conical surface 43 extends rearwardly and has an included apex angle of 50° for reasons given in detail hereinafter.

The rearward end of the poppet has an axial bore 44 to receive the cylindrical stem 45 of the seal retainer 46. The seal retainer 46 has an enlarged head 47 with an outer conical surface 48 having an included apex angle of 60°, the same angle as that of the valve seat 24. An axial bore 49 passes through the seal retainer 46 for the purpose of allowing entrapped air to escape from the chamber formed by bore 44 when the seal retainer is pressed into place in the poppet during assembly. The seal 50 is in the form of an annular disc which is clamped between radially extending annular faces 51 and 52 on the end of poppet 35 and on seal retainer 46, respectively. The end face 51 of the poppet is provided with an annular groove 53 into which the seal is extruded when the poppet is assembled to aid in clamping the seal against radial movement out of the space between the annular faces 51 and 52. The seal 50 projects outward beyond the conical surfaces 43 and 48, and has an annular lip portion 54 of about the same thickness as the rest of the seal and which extends forward along the conical surface 43 of the poppet.

The shape and operation of the seal 50 can be understood more clearly in the light of a preferred method of forming the seal and assembling it with the poppet 35 and seal retainer 46. The seal is cut or punched out of a thin, smoothly finished sheet of plastic material, preferably of a polyester plastic such as polyethylene terephthalate. The cut disc is then baked at an elevated temperature of about 300° F. to 325° F. to relieve the internal stresses formed in the manufacture of the sheet and the cutting of the disc. A disc made of polyethylene terephthalate also shrinks between 3% and 5% in size as a result of the heating, but it becomes stabilized after this initial heating and will not change in size thereafter even when re-exposed to the same temperature. The seal is then placed between the poppet 35 and the seal retainer 46 which are then pressed together in a press, after which operation the poppet, the seal, and the retainer form an integral unit by virtue of the interference fit between the stem 45 of the seal retainer and the bore 44 of the poppet. The pressure used in assembling these parts must be sufficiently high to cause part of the seal material to flow into the annular groove 53, but not so high as to cause any additional plastic flow and extrusion of the seal from the space between the annular faces 51 and 52.

The annular lip portion 54 is formed on the seal 50 with the use of the tool shown in FIG. 6. This tool comprises a cup 60 having an axial bore 61 and a poppet receiving seat 62 through which the poppet stem 36 can extend. A plunger 63 is made to slide within the axial bore 61 and has a cap portion 64 to which pressure may be applied. Plunger 63 also has an axial bore 65 which serves as a vent for air entrapped within the cup, and which at its inner end opens onto a smoothly finished conical surface 66 having an included apex angle of 60°, making it conformable in shape to the valve seat 24. The tool is then placed in a press and the plunger 63 forced toward the assembled poppet so that the conical surface 66 forces the projecting rim of the seal 50 back over the conical poppet surface 43 to form the annular lip 54 with sufficient pressure to cause cold flow of the seal material and give a permanent set to the annular lip 54. The seal 50 after cold forming may be described as an apertured flanged disc having the flange or lip portion 54 thereof angularly disposed with respect to the disc clamped between members 35 and 46.

Figure 2:
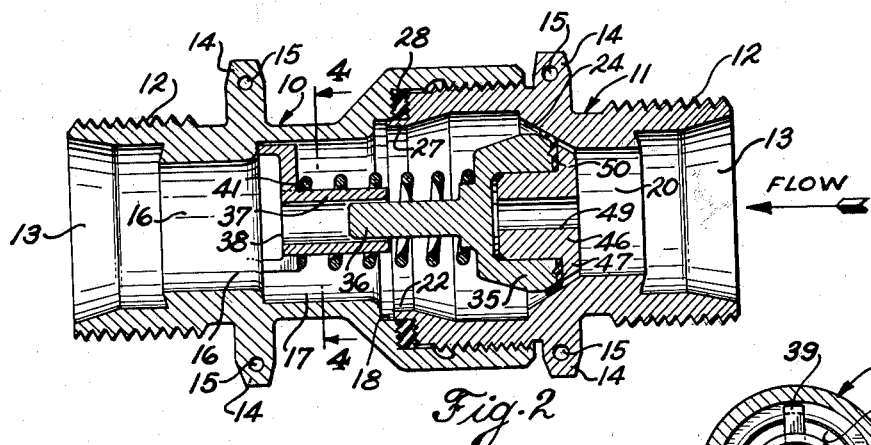
FIG. 2 is a longitudinal cross-sectional view of the valve shown in FIG. 1 after it has been completely assembled and showing the valve in the closed condition.
Figure 3:
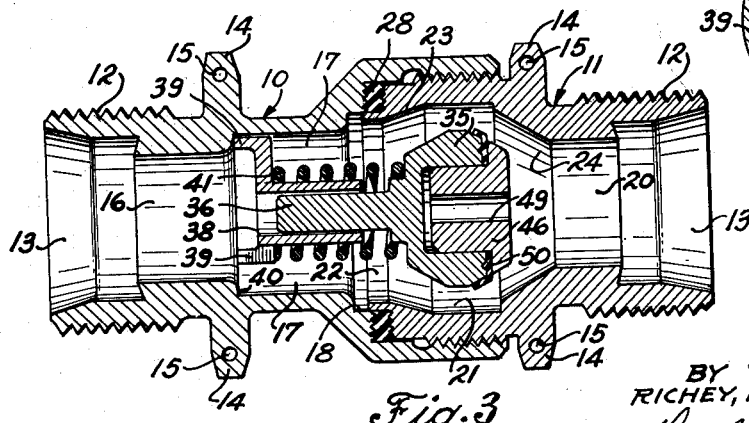
FIG. 3 is a longitudinal cross-sectional view similar to FIG. 2, but showing the valve in the open position.

The operation of the assembled check valve and of the seal 50 is shown most clearly in FIGS. 2, 3, and 8. Whenever the fluid pressure in inlet bore 20 is greater than that in outlet bore 16 and sufficient to overcome the resistance of the spring 41, the poppet moves axially forward, as shown in FIG. 3, to leave a clear and relatively unrestricted passage for fluid flow around the poppet and through the check valve in the forward direction. When the check valve closes, as determined by the fluid pressure in outlet bore 16 being higher than the fluid pressure in inlet bore 20, the poppet moves axially rearward until the annular lip 54 of seal 50 comes into abutting contact with the valve seat 24 to close and seal the valve against reverse fluid flow.

As is shown most clearly in FIG. 8, since the valve seat surface makes a 30° angle with the axis of the valve while conical surface 43 makes only a 25° angle with the axis, there exists a wedge shaped clearance space indicated at 55 between the under surface 56 of lip 54 and the conical surface 43. This clearance space provides a lip sealing action by allowing the fluid pressure to act on this under surface 56 and force the annular lip 54 outward and into abutting contact with the surface of the valve seat 24 along the entire length of the outer surface 57 of the lip. The greater the fluid pressure applied to the under surface 56, the greater is the contact pressure between the outer surface 57 and the valve seat. Thus lip 54 acts as a lip seal inasmuch as the sealing pressure between the sealing surfaces 57 and 24 becomes proportionately greater as the fluid pressure to be sealed against increases.

It will be noted that no portion of the surfaces of the poppet 35 or the seal retainer 46 comes into contact with the valve seat 24, but that sealing contact is made solely between the annular lip 54 and the valve seat. By having contact at these points only, not only is a higher unit pressure obtained between the seal 50 and the valve seat 24, but a clearance space between the valve seat 24 and the conical surfaces 43 and 48 of the poppet and the seal retainer is maintained at all times to allow for the different rates and amounts of thermal expansion on the part of the poppet 35 and seal retainer 46, as compared to that of the rearward body section 11 on which the valve seat is formed.

When the valve poppet is in the open position, the protruding seal lip produces very little turbulence in the forward fluid flow, since by virtue of its thinness it projects only a small distance above the conical surfaces 43 and 48 as compared to the distance between the outer surface 57 of the lip and the valve seat 24. Any tendency on the part of eddy currents in the fluid to lift up the annular lip 54 during forward fluid flow as a result of such eddy currents flowing rearwardly into the clearance space 55 is overcome by virtue of the permanent set imparted to the annular lip 54 which gives it sufficient rigidity and stiffness to prevent any such lifting action.

An example of a check valve constructed in accordance with the present invention employs stainless steel for the body sections 10 and 11 to provide corrosion resistance against environmental conditions. Both the poppet 35 and the seal retainer 46 are made from a heat treated high strength aluminum alloy. Since such an aluminum alloy has a thermal coefficient of expansion on the order of $12.6 \times 10^{-6}/°F.$, a seal made out of polyethylene terephthalate which has a coefficient of expansion on the order of $15 \times 10^{-6}/°F.$, will expand and contract at approximately the same rate as the aluminum poppet and seal retainer. Such a valve construction has provided an efficient and reliable check valve operating over a range of ambient temperatures from $-320°$ F. to $+160°$ F., and for brief periods at temperatures as high as $450°$ F., when used with gaseous helium as the fluid medium at pressures ranging as high as 6,000 p.s.i., although a pressure of only 10 p.s.i. is sufficient to open the poppet and allow full flow in the forward direction.

It has been found that if the seal is made of a material which has a thermal coefficient of expansion which is more than 1.5 times greater than that of the metal used for the poppet and seal retainer, the higher rate of thermal expansion of the seal causes it to wrinkle and buckle between the poppet and seal retainer when the valve is exposed to temperatures ranging toward the upper of the above-mentioned extremes. Similarly, at low temperatures the greater rate of thermal contraction of such a seal creates a gap between the seal and the end face 51. Both the wrinkling and buckling of the seal and the gap cause leakage by creating a leakage passage around the seal between the retainer and the poppet so that under these conditions the sealing effectiveness of such a seal material will fall below requirements of the specification for the valve. Since polyethylene terephthalate has a thermal coefficient of expansion of only about 1.2 times that of the aluminum alloy, this particular combination of materials avoids this sealing problem, but it is understood that other combinations of materials having the ratio of their thermal coefficients of expansion within the limit of 1.5:1 may also be used.

It should be noted that the effectiveness of this poppet construction over a wide temperature range does not depend upon the thermal coefficient of expansion of the material used for the valve seat, and such materials as stainless steel, which has a thermal coefficient of expansion about half that of aluminum, may be used for such parts without impairment of the reliability and efficiency of the valve. If the valve seat expands or contracts a greater amount than do the poppet, seal retainer and seal, a sealing fit will be made by the poppet assembly at a greater or lesser depth on the conical valve seat surface so long as the valve seat is not distorted out of its proper conical shape.

Although only one embodiment of the invention has been shown and described, it is understood that the valve structure may be modified and different materials substituted for the various valve parts as required for different operating conditions without departing from the scope of the invention as defined in the appended claims.

What is claimed is:

1. A valve comprising a body, a conical valve seat on said body, said valve seat flaring rearwardly from a reduced diameter portion at the forward end to an enlarged diameter portion, an axially movable poppet in said body coaxial with said valve seat, a radial face and an annular conical face on said poppet, said radial poppet face having a diameter intermediate those of the reduced and enlarged portions of said valve seat, said conical poppet face having an apex angle less than that of said valve seat, a seal retainer having a radial face opposed to said first-named radial face secured to said poppet, and a centrally perforated annular sealing member of resilient sheet material secured between said poppet and said retainer, said sealing member extending across the radial face of said poppet to said conical poppet face, said sealing member having a rearwardly extending conical lip portion adapted to sealingly engage with said conical valve seat, the rearward end of said lip being spaced away from said conical poppet face and in contact with said conical valve seat when said poppet is in the closed position with the forward end of said conical lip compressed between said poppet and said valve seat with said poppet and said retainer being spaced away from said valve seat at all points.

2. A valve comprising a body, a conical valve seat on said body, said valve seat flaring rearwardly from a reduced diameter portion at the forward end to an enlarged diameter portion, an axially movable poppet in said body coaxial with said valve seat, a conical face on said poppet, the apex angle of said conical poppet face being more acute than the apex angle of said conical valve seat, a seal retainer secured on the end of said poppet adjacent said valve seat, said seal retainer having a conical face extending parallel to said conical valve seat and spaced therefrom, and a sealing member of resilient sheet material secured between said poppet and said retainer, said sheet material extending radially outward between said poppet and said retainer to said conical poppet face and said conical retainer face, said radially extending portion of said sealing member having a diameter intermediate those of the reduced and enlarged portions of said valve seat, said sheet material extending rearwardly and outwardly between said conical poppet face and said conical valve seat to provide a pressure assisted lip seal against said valve seat when said poppet is in the closed position with the forward end of said conical lip portion compressed between said poppet and said valve seat.

3. A valve comprising a body, a conical valve seat on said body, said valve seat flaring rearwardly from a reduced diameter portion at the forward end to an enlarged diameter portion, an axially movable poppet in said body coaxial with said valve seat, a conical face on said poppet, the apex angle of said conical poppet face being more acute than the apex angle of said conical valve seat, a seal retainer secured on the end of said poppet adjacent said valve seat, said seal retainer having a conical face extending parallel to said conical valve seat and spaced therefrom, and a sealing member of resilient sheet material of uniform thickness secured between said poppet and said retainer, said sheet material extending radially outward between said poppet and said retainer to said conical poppet face and said conical retainer face, said radially extending portion of said sealing member having a diameter intermediate those of the reduced and enlarged portions of said valve seat, said sheet material extending rearwardly and outwardly between said conical poppet face and said conical valve seat for a distance less than the length of said conical poppet face to form a conical lip portion, the outer end of said sheet material being a spaced distance from said conical poppet face to provide a pressure assisted lip seal against said valve seat when said poppet is in the closed position with the forward end of said conical lip portion compressed between said poppet and said valve seat.

4. A check valve comprising a body, said body having an inlet and an outlet and a chamber therebetween, a conical valve seat on said body between said chamber and said inlet, said valve seat flaring rearwardly from a reduced diameter portion at the forward end at said inlet to an enlarged diameter portion at said chamber, an axially movable poppet in said chamber coaxial with said valve seat, a conical face on said poppet adjacent said valve seat, the apex angle of said conical poppet face being more acute than the apex angle of said conical valve seat, a seal retainer secured on the end of said poppet adjacent said conical poppet face, said seal retainer having a conical peripheral face extending parallel to said conical valve seat and spaced therefrom when the check valve is closed, and a sealing member of resilient sheet material of uniform thickness secured between said poppet and said seal retainer, said sheet material extending radially outward between said poppet and said retainer to said conical poppet face and said conical retainer face, said radially extending portion of said sealing member having a diameter intermediate those of the reduced and enlarged portions of said valve seat, said sheet material extending rearwardly and outwardly between said conical poppet face and said conical valve seat for a distance less than the length of said conical poppet face to form a conical lip seal portion providing a pressure assisted seal against said valve seat when said poppet is in the closed position with the forward end of said conical lip portion compressed between said poppet and said valve seat.

5. A check valve comprising a body, said body having an inlet and an outlet and a chamber therebetween, a conical valve seat on said body between said chamber and said inlet, said valve seat flaring rearwardly from a reduced diameter portion at the forward end at said inlet to an enlarged diameter portion at said chamber, an axially movable poppet in said chamber coaxial with said valve seat, guide means for said poppet, spring means resiliently biasing said poppet toward said valve seat, a conical face on said poppet adjacent said valve seat, the apex angle of said poppet face being more acute than the apex angle of said conical valve seat, a seal retainer secured on the end of said poppet adjacent said conical poppet face, said seal retainer having a conical peripheral face extending parallel to said conical valve seat and spaced therefrom when the check valve is closed, and a sealing member of resilient sheet material of uniform thickness secured between said poppet and said seal retainer, said sheet material extending radially outwardly between said poppet and said retainer to said conical poppet face and said conical retainer face, said radially extending portion of said sealing member having a diameter intermediate those of the reduced and enlarged portions of said valve seat, said sheet material extending rearwardly and outwardly between said conical poppet face and said conical valve seat for a distance less than the length of said conical poppet face to form a conical lip portion providing a pressure assisted lip seal against said valve seat when said poppet is in the closed position with the forward end of said conical lip portion compressed between said poppet and said valve seat.

References Cited in the file of this patent

UNITED STATES PATENTS

| | | |
|---|---|---|
| 1,863,712 | Byfield | June 21, 1932 |
| 2,257,209 | Wells | Sept. 30, 1941 |
| 2,307,546 | Shimer | Jan. 5, 1943 |
| 2,482,198 | Melichar | Sept. 20, 1949 |
| 2,544,209 | Wolcott | Mar. 6, 1951 |
| 2,674,032 | Martin | Apr. 6, 1954 |
| 2,722,232 | Roche | Nov. 1, 1955 |
| 2,772,695 | Harrison | Dec. 4, 1956 |
| 2,820,604 | Ray | Jan. 21, 1958 |
| 2,823,006 | Hare | Feb. 11, 1958 |
| 2,886,283 | Natho | May 12, 1959 |
| 2,918,083 | Clark | Dec. 22, 1959 |
| 2,938,533 | Jensen | May 31, 1960 |
| 2,949,928 | Hobson | Aug. 23, 1960 |
| 2,960,998 | Sinker | Nov. 22, 1960 |
| 2,980,388 | White | Apr. 18, 1961 |
| 3,055,391 | Shur | Sept. 25, 1962 |

OTHER REFERENCES

Mylar Technical Report, E. I. du Pont de Nemours & Co. (Inc.), Wilmington, Delaware, August 1956. (Copy in Div. 60.)